United States Patent
Lasserre et al.

(10) Patent No.: US 11,496,752 B2
(45) Date of Patent: Nov. 8, 2022

(54) LAST COEFFICIENT CODING FOR ADAPTIVE TRANSFORM BASED VIDEO COMPRESSION

(71) Applicant: INTERDIGITAL VC HOLDINGS, INC., Wilmington, DE (US)

(72) Inventors: Sebastien Lasserre, Cesson-Sevigne (FR); Saurabh Puri, Cesson-Sevigne (FR); Patrick Le Callet, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/317,228

(22) PCT Filed: Jul. 12, 2017

(86) PCT No.: PCT/EP2017/067616
§ 371 (c)(1),
(2) Date: Jan. 11, 2019

(87) PCT Pub. No.: WO2018/011303
PCT Pub. Date: Jan. 18, 2018

(65) Prior Publication Data
US 2019/0297335 A1    Sep. 26, 2019

(30) Foreign Application Priority Data
Jul. 15, 2016  (EP) .................. 16305919

(51) Int. Cl.
*H04N 19/18* (2014.01)
*H04N 19/13* (2014.01)
(Continued)

(52) U.S. Cl.
CPC ............ *H04N 19/18* (2014.11); *H04N 19/12* (2014.11); *H04N 19/13* (2014.11);
(Continued)

(58) Field of Classification Search
CPC ........ H04N 19/18; H04N 19/12; H04N 19/13; H04N 19/132; H04N 19/147; H04N 19/176; H04N 19/463; H04N 19/60
See application file for complete search history.

(56) References Cited

U.S. PATENT DOCUMENTS 9,008,171 B2    4/2015   Karczewicz et al.
9,350,996 B2    5/2016   Fang et al.
(Continued)

FOREIGN PATENT DOCUMENTS

CN     104469378 A      3/2015
KR     20130140190 A    12/2013
(Continued)

OTHER PUBLICATIONS

"Maximally Smooth Image Recovery in Transform Coding"; Wang et al., IEEE, Oct. 1993; retrieved Nov. 2, 2021 (Year: 1993).*
(Continued)

*Primary Examiner* — Jonathan R Messmore
(74) *Attorney, Agent, or Firm* — Invention Mine LLC

(57) ABSTRACT

Coding of the last coded coefficient position is performed by basing the coding of they coordinate of the position of the last coded coefficient on knowledge of the size of the partial transform used to generate a block of coefficients from a block of video pixels. This enables a context adaptive coding of the last coded coefficient parameter to be performed much more efficiently.

20 Claims, 8 Drawing Sheets

(51) Int. Cl.

| | | |
|---|---|---|
| *H04N 19/176* | (2014.01) | |
| *H04N 19/60* | (2014.01) | |
| *H04N 19/91* | (2014.01) | |
| *H04N 19/12* | (2014.01) | |
| *H04N 19/147* | (2014.01) | |
| *H04N 19/132* | (2014.01) | |
| *H04N 19/463* | (2014.01) | |
| *H04N 19/192* | (2014.01) | |

(52) U.S. Cl.
CPC ......... *H04N 19/132* (2014.11); *H04N 19/147* (2014.11); *H04N 19/176* (2014.11); *H04N 19/463* (2014.11); *H04N 19/60* (2014.11); *H04N 19/91* (2014.11); *H04N 19/192* (2014.11)

(56) References Cited

U.S. PATENT DOCUMENTS

| 2013/0188688 | A1* | 7/2013 | Panusopone | H04N 19/198 375/240.02 |
|---|---|---|---|---|
| 2014/0003529 | A1 | 1/2014 | Joshi et al. | |
| 2014/0192861 | A1 | 7/2014 | Chuang et al. | |
| 2015/0110199 | A1* | 4/2015 | Ikai | H04N 19/117 375/240.18 |
| 2015/0264403 | A1 | 9/2015 | Chong et al. | |
| 2015/0287223 | A1* | 10/2015 | Bresler | G06T 11/006 382/131 |
| 2017/0078672 | A1* | 3/2017 | Han | H04N 19/159 |

FOREIGN PATENT DOCUMENTS

| KR | 20140098120 A | 8/2014 |
|---|---|---|
| WO | WO2012139192 | 10/2012 |
| WO | WO2013070610 | 5/2013 |

OTHER PUBLICATIONS

Hong et al.,Low-complexity 16×16 and 32×32 transforms and partial frequency transform,94 MPEG Meetting. Guangzhou, No. M18247,Oct. 8, 2010.

Fuldseth (Cisco) A, Reducing the table sizes for LCEC, 4 JCT-VC Meeting; 95 MPEG Meeting; DAEGU,Jan. 15, 2011.

Sezer et al.,Sparse orthonormal transforms for image compression. 15th IEEE International Conference on Image Processing : ICIP 2008, San Diego,Oct. 12, 2008,pp. 149-152.

Fuldseth et al.,CE10 : Core transform design for HEVC, 97 MPEG Meeting, Torino, No. m20876,Jul. 15, 2011.

Joshi, et al., Techniques for Increasing Throughput in HEVC Transform Coefficient Coding, Proceedings of the SPIE—The International Society for Optical Engineering, vol. 8499, 849911, (2012).

Alshina, E., et al, "CE7: Experimental results of ROT by Samsung", JCT-VC of ITU-T SG 16 WP 3 and ISO/IEC JTC 1/SC 29/WG 11, Document No. JCTVC-E380, 5th meeting pp. 1-10 (10 pages).

Chen, J., et al., "Algorithm Description of Joint Exploration Test Model 3", Joint Video Exploration Team (JVET) of ITU-T SG 16 WP 3 and ISO/IEC JTC 1/SC 29/WG 11, Document: JVET-C1001_V3, 3rd Meeting: Geneva, CH, May 26-Jun. 1, 2016. (37 pages).

Hong, Y. M, et al., "Low-complexity 16×16 and 32×32 transforms and partial frequency transform." In JCTVC-C209, Joint Collaborative Team on Video Coding (JCT-VC) of ITU-T SG16 WP3 and ISO/IEC JTC1/SC29/WG11, 3rd Meeting: Guangzhou, CN, 2010 pp. 1-11 (11 pages).

Sezer, O. G. et al., "Sparse orthonormal transforms for image compression." In 2008 15th IEEE International Conference on Image Processing, IEEE, 2008 pp. 149-152 (4 pages).

Fei, X. U. "Optimization Algorithm of HEVC Entropy Coding." Computer and Modernization 12, No. 12 2013 (4 pages).

International Telecommunication Union, "High Efficiency Video Coding". Series H: Audiovisual and Multimedia Systems; Infrastructure of Audiovisual Services—Coding of Moving Video, Recommendation ITU-T H.265, Telecommunication Standardization Sector of ITU, Apr. 2015, pp. 105-106, 200-201 (7 pages).

Sole, J. et al., "Transform coefficient coding in HEVC." IEEE Transactions on Circuits and Systems for Video Technology 22, No. 12, Dec. 2012, pp. 1765-1777 (13 pages).

McGoldrick, C. S. et al., "Image Coding Using The Singular Value Decomposition And Vector Quantization." In Fifth International Conference on Image Processing and its Applications, 1995., pp. 296-300 (5 pages).

Kang, J. F. et al., "Combined techniques of singular value decomposition and vector quantization for image coding." EEE Transactions on Image Processing vol. 4, No. 8, 1995 pp. 1141-1146 (6 pages).

* cited by examiner

LAST COEFFICIENT CODING FOR ADAPTIVE TRANSFORM BASED VIDEO COMPRESSION

TECHNICAL FIELD

The present principles relate to video compression and decompression systems generally and, more particularly to block based transforms.

BACKGROUND

A transform T transforms a block of n pixels into n transformed coefficients. The process is invertible by applying the inverse transform $T^{-1}$ to the transformed coefficients to get the pixel values back. In the case of a partial transform P, the n pixels are transformed into less than n transformed coefficients, m where m<n. Equivalently, it can be assumed that the missing m-n coefficients are set to zero. An approximate "inverse" transform P' is applied to the transformed coefficients to obtain an approximation of the initial pixel values. P' is an approximation and not an exact mathematical inverse because the partial transform is not invertible. Typically, a partially transformed block of coefficients are representative of the low frequency information of the pixel block.

In some video coding standards, transformed coefficients are put into a two dimensional (2D) block to which is associated a scanning order; typically, from high frequency to low frequency. After quantization of the coefficients, the first, relative to the high to low frequency scan order, non-zero quantized coefficient is called the last coded coefficient, as shown on FIG. 1.

In the 2D block topology associated to the coefficients, the last coded coefficient has two coordinates (x,y) as shown on FIG. 2 for a block of size n=N×N.

By definition, $0 \leq x$, $y \leq N-1$. These two coordinates are coded into the bit-stream as information to determine the non-zero coded coefficients on the decoder side. At the least, these coordinates indicate that the coefficient of coordinate (x,y) is not zero, and the coefficients coming after this coefficient, relative to the low to high scanning order, are all zero.

Additional information indicating significance of transformed coefficients may be added to signal whether the remaining coefficients (question-marked on FIG. 1) are zero or not.

Conventionally, in many video and image codecs developed in the last decades, fixed transforms, such as the Discrete Cosine Transform or Discrete Sine Transform, for example, are applied to the pixels of each block to obtain the transformed coefficients. These coefficients are then quantized by a quantifier Q to obtain quantized coefficients which are encoded by an entropy coder, such as VLC, arithmetic coder, or Context Adaptive Binary Arithmetic Coding (CABAC), for example.

It is desired to encode the last coded coefficient position as efficiently as possible.

As an alternative to fixed transforms, content-adaptive partial transforms can be used. This leads to a better compression of energy, thus reducing the bit rate. However, the adaptive transforms must be sent to the decoder, increasing the bitrate in return. If one does not take care in sending such the transforms, the global bit rate increases, despite the better compression, and the adaptive transforms are of no benefit.

The HEVC/H.265 standard introduced the coding of the last coded coefficient position by using two coordinates (x,y). Each coordinate is binarized using a truncated unary code, and then each bit, or "bin" in the HEVC terminology, is encoded using CABAC with channel adaptation based on contexts. In HEVC, the two coordinates x and y are encoded and decoded separately.

SUMMARY

These and other drawbacks and disadvantages of the prior art are addressed by the present principles, which are directed to a method and apparatus for coding a last coded coefficient, obtained through use of a partial transform, using knowledge of the size of the partial transform.

According to one aspect of the present principles, a method for coding a set of transformed coefficients is provided comprising a step of transforming a block of image values to obtain transformed coefficients, and a set of entropy coding a position of a last coded coefficient wherein the position of the last coded coefficient is provided by two coordinates such that the entropy coding of the y coordinate depends on knowledge of the size of the partial transform used to obtain the coefficients.

According to another aspect of the present principles, an apparatus for coding a set of transformed coefficients is provided comprising a transform circuit operating on a block of image values to obtain transformed coefficients, and an entropy coder wherein the position of a last coded coefficient of the transformed coefficients is provided by two coordinates such that the entropy coding of the y coordinate depends on knowledge of the size of the partial transform used to obtain the coefficients.

According to another aspect of the present principles, a method is provided for decoding a set of transformed coefficients. The method comprises entropy decoding the transformed coefficients to generate a position of a last coded coefficient, wherein the position of the last coded coefficient is provided by two coordinates (x,y) characterized in that said entropy decoding of a y coordinate depends on knowledge of the size of the partial transform used to obtain the coefficients, and a step of inverse transforming transformed coefficients to obtain a block of image values.

According to another aspect of the present principles, an apparatus is provided for decoding a set of transformed coefficients. The apparatus comprises an entropy decoder that operates on a code representing a position of a last coded coefficient from the transformed coefficients, wherein the position of the last coded coefficient is provided by two coordinates (x,y) characterized in that the entropy coding of a y coordinate depends on knowledge of the size of the partial transform used to obtain the coefficients. The apparatus further comprises an inverse transform circuit operating on transformed coefficients to obtain a block of image values.

According to another aspect of the present principles, a non-transitory computer readable storage medium is provided having stored thereon instructions for decoding a set of transformed coefficients such that the position of the last coded coefficient is provided by two coordinates (x,y) characterized in that an entropy coding of a y coordinate depends on knowledge of the size of the partial transform used to obtain the coefficients.

According to another aspect of the present principles, a non-transitory computer readable storage medium is provided having stored thereon a bitstream for decoding a set of transformed coefficients such that the position of the last coded coefficient is provided by two coordinates (x,y) characterized in that an entropy coding of a y coordinate depends on knowledge of the size of the partial transform used to obtain the coefficients.

These and other aspects, features and advantages of the present principles will become apparent from the following detailed description of exemplary embodiments, which are to be read in connection with the accompanying drawings.

DETAILED DESCRIPTION

The technical problem solved by the following embodiments is reducing the cost of coding the position of the last coded coefficient in a transformed block of pixels to which a 2D partial transform has been applied.

These embodiments are an improvement of the entropy coding scheme commonly used in video coding standards. One such video coding standard is the HEVC/H.265 standard, but the embodiments are not limited to that standard.

The main idea of the present principles is that if a partial transform is used on a block of pixel values, it is known that some transformed coefficients are necessarily zero, thus imposing some constraints on the position of the last coded coefficient and on the coordinates representing the position of the last coded coefficient (x,y). In the described embodiments, the focus is on using such constraints to efficiently encode the two coordinates (x,y) in case a partial transform is used to transform a block of pixels to transform coefficients.

The present ideas use the fact that not all coordinate pairs (x,y) are acceptable in the case where m<n so that the coding of (x,y) is more efficient. This can lead to improved compression performance.

In particular, if one uses partial transforms, it implicitly takes into account the fact that not all coordinate pairs (x,y) are acceptable, such that the coding of (x,y) is more efficient. In this particular embodiment with partial transforms, tests have been conducted on a modified HEVC standard using partial transforms and it has been shown that an improved coding of (x,y) leads to a compression gain of about −0.5%

The ideas presented herein propose to keep the main part of the HEVC algorithm to code the coordinate pair (x,y), but it adds a feature, that is, the reduction of possible range of coding y once x is known.

Figure 3:
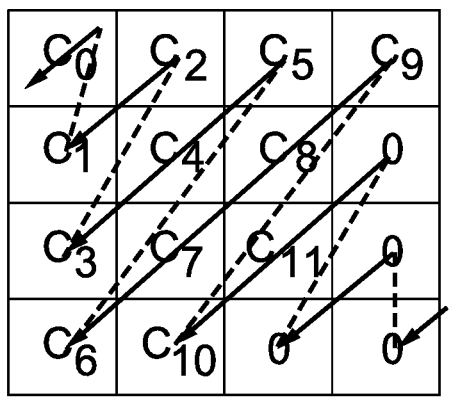
FIG. 3 shows an example of coding in a 4×4 transform unit with twelve coefficients.

For instance, as in FIG. 3, consider a 4×4 block with a partial transform P leading to m=12 transformed coefficients. As a consequence, one knows that coefficients 0 through 11 can be non-zero, but coefficients 12 to 15 are necessarily zero.

The coordinate x for the last coded coefficient is in the range 0 (for positions 0, 1, 3, 6) to 3 (only for the position 9). Once x is known, the range of y actually depends on x. In the example above, one has:

x=0 or x=1 leads to y in the range [0,3]
x=2 leads to y in the range [0,2]
x=3 leads to y=0; in this case y does not even need to be coded One easily understands that this process of coding is decodable as one decodes x, then deduces the range for y, assuming that m is known and encoded somewhere, then decodes y.

Figure 4:
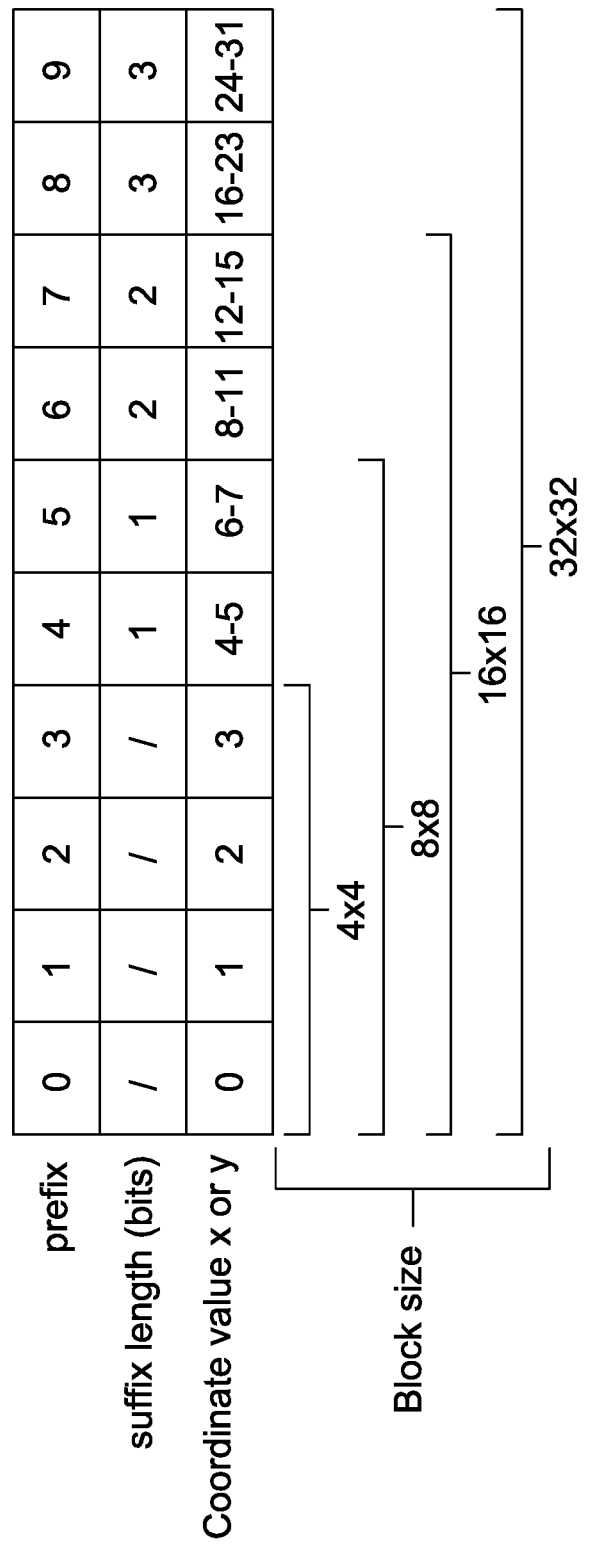
FIG. 4 shows suffix and prefix determination for a coordinate value.

In HEVC, a coordinate x or y is split into a prefix and a suffix as shown in FIG. 4.

For instance, if the coordinate value is 14, the prefix is 7 and the suffix is coded in 2 bits. The suffix is the remainder after the first value is subtracted from the coordinate value, 14−12=2. If the coordinate value is 3, then the prefix is 3, but there is no suffix.

The prefix is binarized using a truncated unary coding. The truncation is performed based on the knowledge of the block size that provides an upper bound for the prefix value. Each bit of the binarized prefix is encoded using CABAC and a dedicated context.

For instance, in a 4×4 block the possible prefix are 0, 1, 2 or 3 which are respectively binarized into 1, 01, 001 and 000 (truncated). In another example, in a 8×8 block, the possible prefix are from 0 to 5 and binarized into 1, 01, 001, 0001, 00001 and 00000 (truncated).

The suffix is binarized using a fixed length coding, and the fixed length suffix is encoded as is, using CABAC in bypass mode without using contexts. For instance, if the coordinate value is 14 in a 16×16 block, the prefix is 7 (binarized into 0000000) and the suffix is 2 (binarized into 10 and coded on 2 bits).

The binarization process into prefix and suffix is kept as in HEVC, using contexts only for the prefix. The main characteristic of the present principles is that the contexts of y can be reduced in range, depending on the value of x.

Usually, a transform T transforms a block of n pixels into m=n transformed coefficients. The process is invertible by applying the inverse transform $T^{-1}$ to the transformed coefficients to get the pixel values back. In case of a partial transform P, the n pixels are transform into less m<n transformed coefficients. Equivalently, it may be assumed the lacking m-n coefficients are set to zero. An "inverse" transform P' (of course not the mathematical inverse because the partial transform is not invertible) is applied to the transformed coefficient to obtain an approximation of the initial pixel values. Typically, partially transformed coefficients are representative of the low frequency information of the pixel block.

If a partial transform is used, it is known that some m-n transformed coefficients are necessarily zero, thus imposing some constraints on the position of the last coded coefficient and on the coordinates (x,y). In this case, by implicitly using these constraints, it is shown that the embodiment automatically handles the efficient encoding of the two coordinates (x,y) in case a partial transform is used to transform the TU pixels to transformed coefficients.

Instead of the systematic transforms such as DCT or DST, an adaptive set of orthogonal transforms may be used instead that are learned offline on a large training set using different classification and transform optimization schemes. This set of transforms is fed to a codec and the best transform out of a set is chosen in a Rate Distortion Optimization (RDO) loop. A more adaptive approach is to learn a set of orthogonal transforms for a particular intra frame of a sequence. This is referred to as an on-the-fly block based transform learning scheme in the rest of the specification. This scheme is shown in FIG. 5.

Figure 5:
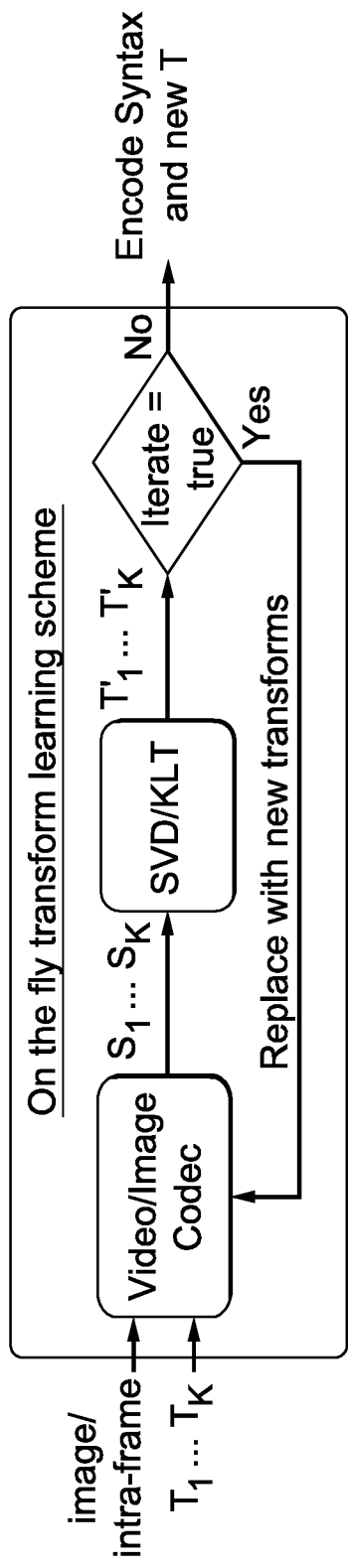
FIG. 5 shows an on-the-fly learning scheme.

The block diagram of FIG. 5 shows a typical on-the-fly scheme in which the algorithm is split into two parts, i.e. classification of the residual blocks inside the video/image codec and generation of the new set of transforms. The first step classifies the residual blocks into K different classes ($S_1 \ldots S_K$). In the second step, a new transform is obtained for each class using minimization of the reconstruction error for that particular class. Typically, Singular Value Decomposition (SVD) and (Karhunen-Loève Transform) KLT are used to generate an orthogonal set of transforms. These two steps are iterated until convergence of the solution or a stop criterion is reached. As seen in the block diagram, the input to the system is an intra frame or an image along with some initial set of non-separable orthogonal transforms ($T_1 \ldots T_K$). The system outputs a set of learned transforms ($T'_1 \ldots T'_K$) along with the syntax information that need to be encoded into the bit-stream which is sent to the decoder. In general, the overhead bits required to encode these transform basis vectors is significantly large compared to the bits required to encode the frame.

Due to the energy compaction property of SVD, it is observed that the overhead cost can be considerably reduced by deducing an incomplete representation of the learned transform where, only first 'm' vectors are transmitted to the decoder and the remaining (n-m) transform vectors are either generated using a completion algorithm similar to the Gram-Schmidt method or forced to zero, thus leading to a partial transform.

Figure 6:
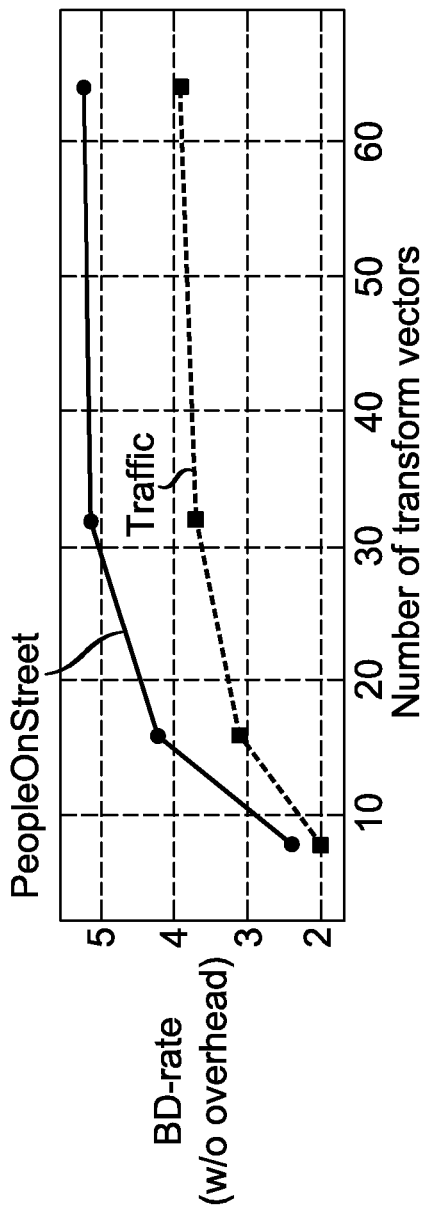
FIG. 6 shows the BD-rate gain versus the number of transform vectors for various scenes.

In order to illustrate the effect of dropping the last few vectors of a transform on the Bjontegaard Distortion rate (BD-rate), four non-separable optimized transforms of size 64×64 are learned on the 4K sequences 'PeopleOnStreet' and 'Traffic'. Encoding tests are performed on these sequences where the first 'm' vectors are retained and the rest of the basis vectors are then completed using a completion algorithm. FIG. 6 shows the variation of the performance gain with respect to the number of coded basis vectors. The vertical axis is the percentage gain relative to the anchor (HEVC test software HM15.0) and without taking the transform cost into account.

Figure 1:
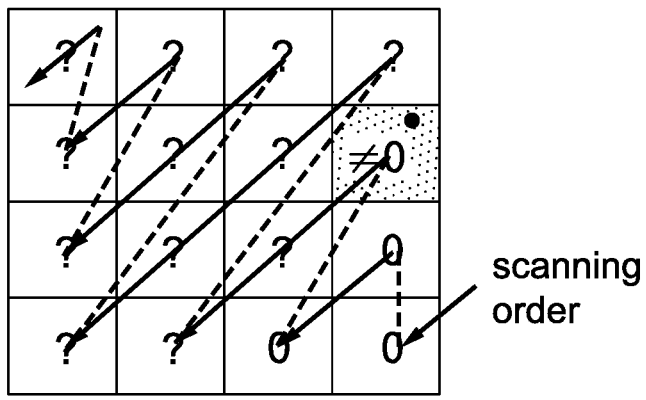
FIG. 1 shows the scanning order of a transform unit.
Figure 2:
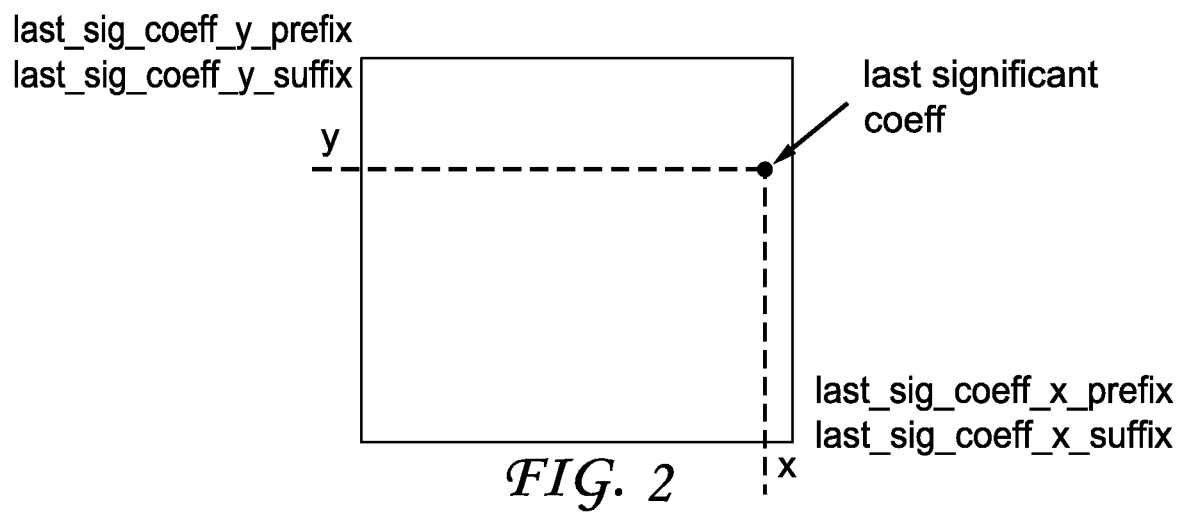
FIG. 2 shows an example of coordinates for a last coded coefficient.

It is observed in FIG. 2 that by retaining just the first half of the transform vectors i.e. m=32, there is negligible performance drop in terms of BD-rate. For the case of m=16, i.e. when only first 16 basis vectors are coded, the performance drops by 1% compared to the overall bit-rate obtained by coding all 'n' basis vectors, but the overhead cost of transform vectors reduces to one fourth of the total overhead. For m=8, there is considerable loss of performance in terms of BD-rate performance but also reduces the overhead further. In general, this shows that there exists a trade-off between the performance loss and the overhead cost.

Since, the performance drop in terms of BD-rate when encoding only first 'm' transform vectors depends on the video content, a content-adaptive method is necessary to estimate the optimal value of 'm'. Intuitively, at low bit-rates, most of the coefficients are quantized to zero and at high bit rate, the coefficients' energy is significant even at high frequencies. Therefore, the value of 'm' depends on the content as well as the quantization parameter QP.

The residual signal energy on the average is concentrated more in the first few coefficients where, the DC coefficient has on the average maximum energy and it decreases as we go towards the higher frequency coefficients. Therefore, most of the high frequency coefficients are quantized to zero. A simple threshold based method can be applied in order to compute the best value of 'm' which is required to be coded along with the frame as an overhead.

Let E be the sum of energy of the DCT coefficients. A threshold t is defined by the multiplication of a parameter p with E to get, $t=p \cdot E$ The value of 'm' can simply be computed from the number of coefficients with average energy greater than this threshold. The value of 'p' can be found experimentally. Table 1 shows the variation of the number of vectors 'm' above this threshold for a chosen value of 'p' in terms of percentage of total number of vectors that are encoded. It is observed from Table 1 that at high QP, the average number of vectors required are much less compared to that required at low QP. Moreover, the number of vectors 'm' also varies depending on the content.

TABLE 1

Number of vectors to encode vs threshold for different sequences

| QP | 'p' | PeopleOnStreet | Traffic | Nebuta | SteamLocomotive |
|---|---|---|---|---|---|
| 22 | 0.01 | 0.23 | 0.24 | 0.30 | 0.32 |
|  | 0.005 | 0.27 | 0.29 | 0.32 | 0.35 |
|  | 0.001 | 0.45 | 0.48 | 0.46 | 0.46 |
| 27 | 0.01 | 0.20 | 0.22 | 0.28 | 0.31 |
|  | 0.005 | 0.25 | 0.27 | 0.31 | 0.34 |
|  | 0.001 | 0.38 | 0.39 | 0.38 | 0.43 |
| 32 | 0.01 | 0.18 | 0.19 | 0.26 | 0.28 |
|  | 0.005 | 0.21 | 0.22 | 0.29 | 0.30 |
|  | 0.001 | 0.29 | 0.30 | 0.39 | 0.36 |
| 37 | 0.01 | 0.14 | 0.15 | 0.23 | 0.23 |
|  | 0.005 | 0.18 | 0.18 | 0.26 | 0.25 |
|  | 0.001 | 0.23 | 0.23 | 0.30 | 0.30 |

Percentage of total number of vectors to encode (in %)

When the present principles are applied using partial transforms, the range of y depends on x.

Consider again the example of FIG. 3 using a partial transform with m=12 such that the last 16−12=4 are always zero. How should one code the coordinate (2,2), associated with the coefficient position 12, most efficiently? One possibility is to code x=2 first. Its binarization is 001, as in HEVC. Then, one knows that the possible range for y is 0 to 2, so one can use the truncated unary coding up to 2, instead of the truncated unary coding up to 3 as in HEVC. This leads to the binarization 00 for y, instead of 001. And, one has gained one bit in the binarization process, thus leading to a better compression performance.

Figure 7:
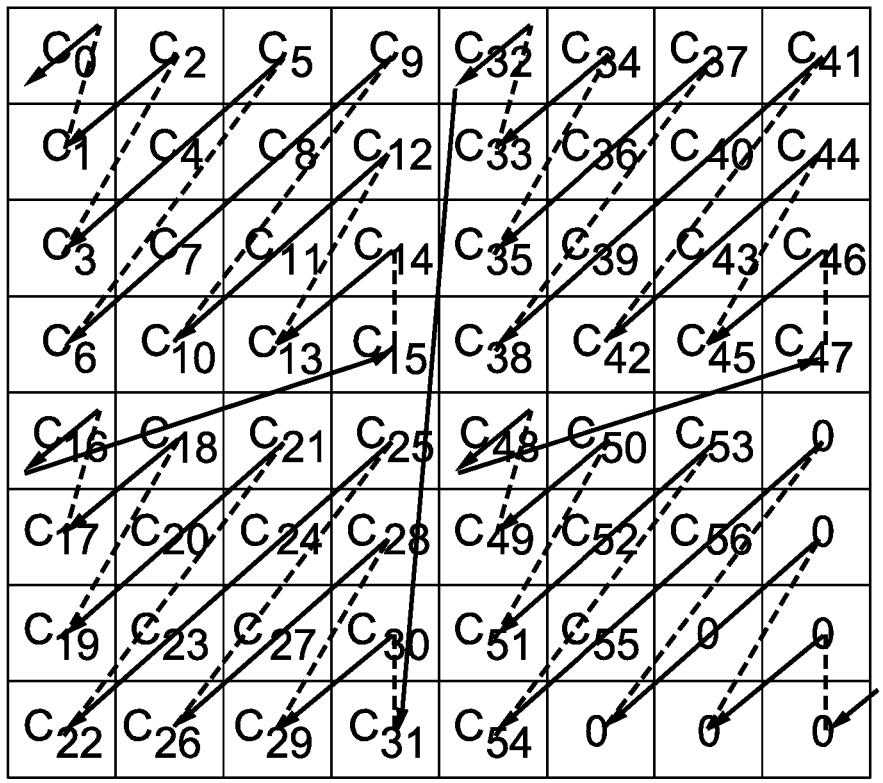
FIG. 7 shows coding for an 8×8 block with a partial transform.

Some additional examples of binarization using this embodiment in the example of FIG. 3:

(3,0) binarized into (000, nothing) instead of (000,0)
(0,0) binarized into (0,0) as in HEVC
(3,3) is an impossible coordinate The embodiment with partial transforms easily extends to a coordinate y that uses a suffix, as in FIG. 7 for an example in an 8×8 TU, using a partial transform with m=57. The first 57 transformed coefficients may be non-zero, but the last 64−57=7 coefficients are necessarily zero. Let us suppose that the last coded coefficient position is 55. This gives coordinates (x,y)=(5,6). The prefix for y is 5 and its suffix is 0. In HEVC, the suffix should be coded on 1 bit, but in our case, we know that the suffix cannot be 1 because the coefficient 58, just below the coefficient 55, is necessarily known in this case to be zero, so the suffix is not coded and one bit of coding is gained.

In the HEVC/H.265 standard, a new tool for coding binary data has been proposed in the arithmetic coder, namely the Context-Adaptive Binary Arithmetic Coding (or CABAC). A binary symbol s, which takes value 0 or 1, is coded following a probability p to be 1 and 1-p to be 0. This probability is deduced form a context and is adapted after each symbol coding.

Figure 8:
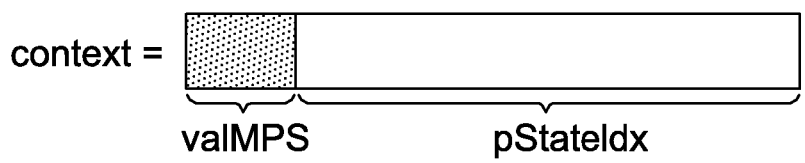
FIG. 8 shows the structure of a context value.

A context value is an 8 bit value, see FIG. 8. The leading bit represents the Most Probable Symbol (or MPS) and the next 7 bits represent a probability p' (or state) from which the probability p is deduced.

Figure 9:
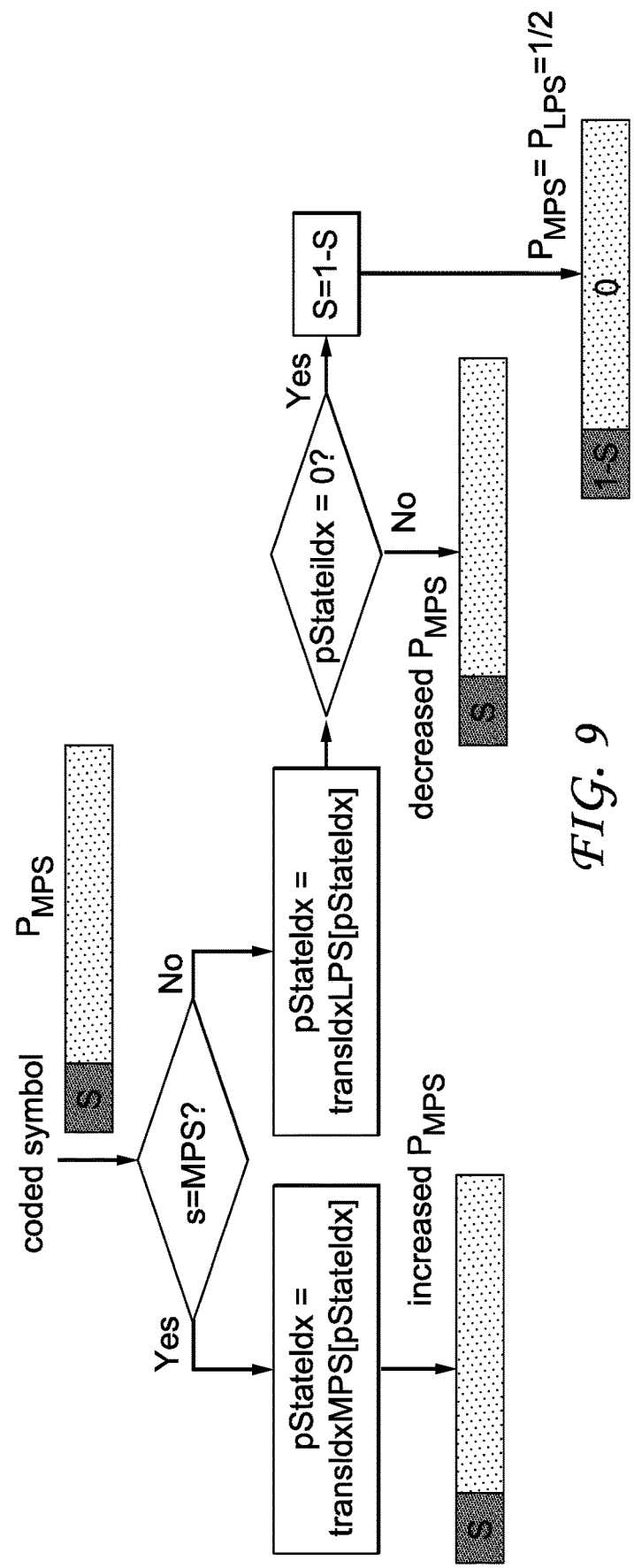
FIG. 9 shows the evolution of a context value.

The update of the context value is made following the process described in FIG. 9, depending on whether or not the coded symbol equals the MPS.

The evolution is made through two tables, transIdxMPS if the coded symbol is the MPS, and transIdxLPS if the coded symbol is not the MPS, i.e., it is the Least Probable Symbol (LPS). These tables are provided in Table 2 for the entry p', whose name is pStateIdx.

TABLE 2 tables for the evolution of the context state
Table 9-41 - State transition table

| pStateIdx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| transIdxLps | 0 | 0 | 1 | 2 | 2 | 4 | 4 | 5 | 6 | 7 | 8 | 9 | 9 | 11 | 11 | 12 |
| transIdxMps | 1 | 2 | 3 | 4 | 5 | 6 | 7 | 8 | 9 | 10 | 11 | 12 | 13 | 14 | 15 | 16 |
| pStateIdx | 16 | 17 | 18 | 19 | 20 | 21 | 22 | 23 | 24 | 25 | 26 | 27 | 28 | 29 | 30 | 31 |
| transIdxLps | 13 | 13 | 15 | 15 | 16 | 16 | 18 | 18 | 19 | 19 | 21 | 21 | 22 | 22 | 23 | 24 |
| transIdxMps | 17 | 18 | 19 | 20 | 21 | 22 | 23 | 24 | 25 | 26 | 27 | 28 | 29 | 30 | 31 | 32 |
| pStateIdx | 32 | 33 | 34 | 35 | 36 | 37 | 38 | 39 | 40 | 41 | 42 | 43 | 44 | 45 | 46 | 47 |
| transIdxLps | 24 | 25 | 26 | 26 | 27 | 27 | 28 | 29 | 29 | 30 | 30 | 30 | 31 | 32 | 32 | 33 |
| transIdxMps | 33 | 34 | 35 | 36 | 37 | 38 | 39 | 40 | 41 | 42 | 43 | 44 | 45 | 46 | 47 | 48 |
| pStateIdx | 48 | 49 | 50 | 51 | 52 | 53 | 54 | 55 | 56 | 57 | 58 | 59 | 60 | 61 | 62 | 63 |
| transIdxLps | 33 | 33 | 34 | 34 | 35 | 35 | 35 | 36 | 36 | 36 | 37 | 37 | 37 | 38 | 38 | 63 |
| transIdxMps | 49 | 50 | 51 | 52 | 53 | 54 | 55 | 56 | 57 | 58 | 59 | 60 | 61 | 62 | 62 | 63 |

The probability $p_{MPS}$ of the symbol s to be the MPS is quantized linearly on 8 bits, from 0 to 127. It is deduced from the context value by $$p_{MPS}=(p'+64)/127=(pStateIdx+64)/127$$

and the probability p of the symbol s to be 1 is deduced obviously from $p_{MPS}$ depending on the value of the MPS.
 p=$p_{MPS}$ if MPS=1,
 p=1-$p_{MPS}$ if MPS=0.

Context-Adaptive coding is a powerful tool that allows the coding to dynamically follow the statistics of the channel to which the symbol belongs. Also, each channel should have its own context in order to avoid mixing statistics and losing the benefit of the process. This has led to the extensive use of many contexts in HEVC/H.265, which uses several hundreds of contexts, in order to model many channels. For instance, among all channels using contexts, there are
 motion vector residuals,
 TU coding flags,
 Last significant coefficient position,
 Coding Group coding flags,
 Transformed coefficient significant flags,
 Transformed coefficient magnitude (greater than 1 and greater than 2) flags,
 SAO data,
 other data All of these contexts/channels also largely depend on the color channel, that is whether the channel is luma or chroma, the Transform Unit size, the position of the transformed coefficient, the neighboring symbol values and other factors.

Figure 10:
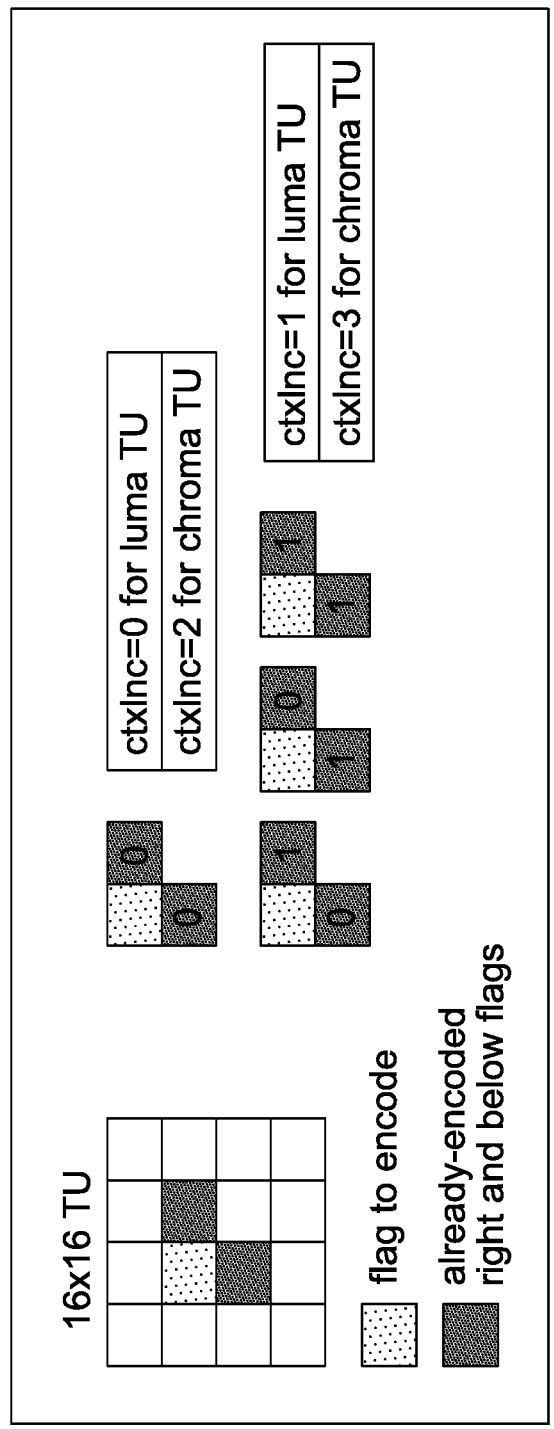
FIG. 10 shows an example of context choice depending on neighboring channels.

As an example, a Coding Group (CG) coding flag is chosen depending on whether or not the CG coding flags below and at the right of the current CG are 1 or not, as shown in FIG. 10.

All in all, the context choice depends on many things, thus the huge number of contexts. Of course, the decoder must update the context values to correspond with what was performed on the encoder side to ensure synchronization with the encoder and parsing of the stream.

The embodiments described herein propose to reduce the range of potential y coordinate candidates by considering the size of the partial transform used to obtain the coefficients from the image block values.

The associated syntax needed to implement the described principles should be encoding of the value of m the size of the partial transform. This value can be coded at a frame or a slice level such that the improved binarization and truncated unary coding is also determinable at a decoder.

Regarding the decoding process, the principles described herein must accordingly impact a decoder to enable it to decode the last coded coefficient position.

In such embodiments using partial transforms, the improved binarization and truncated unary coding of the y suffix is also impacted.

In addition to the above features of the present principles, the described embodiments provide that the coding of m, or information from which the subset of coefficients can be determined, is present in the bitstream. In addition, the last coded coefficient is provided by two coordinates (x,y) and the subset and the value of x are used to determine a range for y. Also, truncated coding is used for the y prefix and suffix based on the determined range.

The proposed idea is normative in the sense that it is present in the syntax of the video stream and implies a decoding method to be applied. As such, the present ideas can be implemented in a video standard, such as the successor to HEVC.

Figure 11:
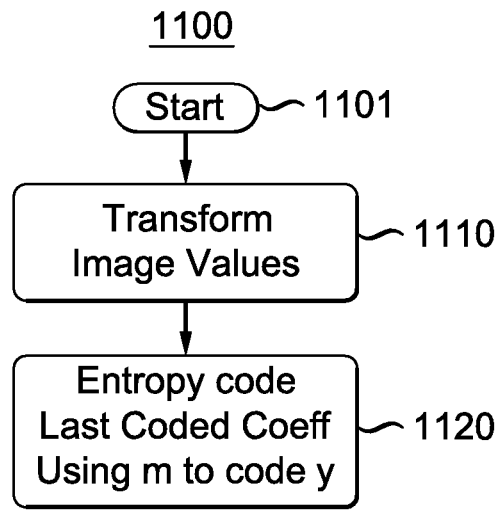
FIG. 11 shows one embodiment of a method for coding a set of transformed coefficients using the present principles.

One embodiment of a method 1100 for coding a set of transformed coefficients is shown in FIG. 11. The method commences at Start block 1101 and control proceeds to block 1110 for transforming a block of image values to produce transformed coefficient values. Control proceeds from block 1110 to block 1120 for entropy coding the last coded coefficient using knowledge of the size of the transform to code the y coordinate.

Figure 12:
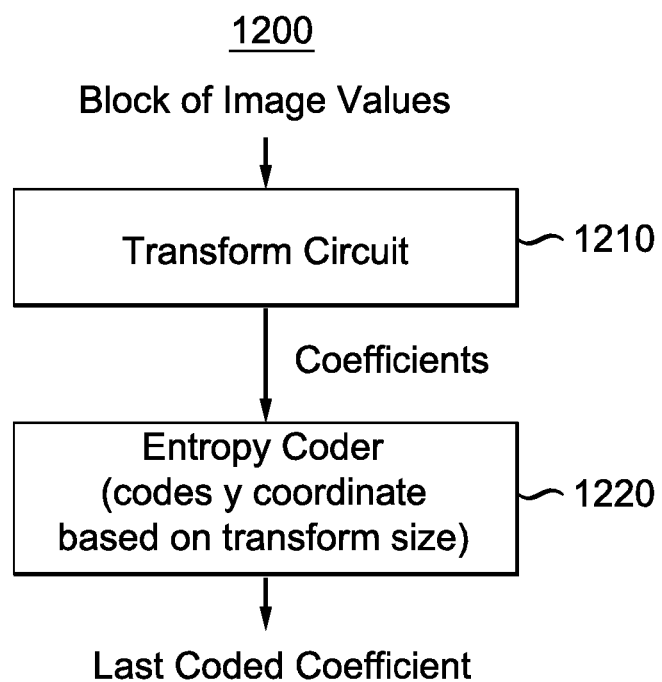
FIG. 12 shows one embodiment of an apparatus for coding a set of transformed coefficients using the present principles.

One embodiment of an apparatus 1200 for coding a set of transformed coefficients is shown in FIG. 12. The apparatus comprises Transform Circuit 1210 that receives a block of image values on its input port and produces transformed coefficients on its output port. This output port of Transform Circuit 1210 is in signal connectivity with the input to Entropy Coder 1220. Entropy Coder 1220 codes the y coordinate of the last coded coefficient position using knowledge of the size of the transform to code the y coordinate to produce a last coded coefficient value.

Figure 13:
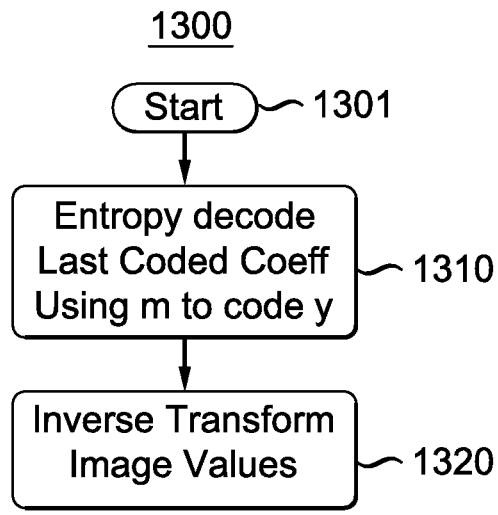
FIG. 13 shows one embodiment of a method for decoding a set of transformed coefficients using the present principles.

An embodiment of a method 1300 for decoding a set of transformed coefficients is shown in FIG. 13. The method commences at Start block 1301 and control proceeds to block 1310 for entropy decoding a last coded coefficient using knowledge of the size of the transform to decode the y coordinate. Control proceeds from block 1310 to block 1320 for inverse transforming coefficients to produce image values.

Figure 14:
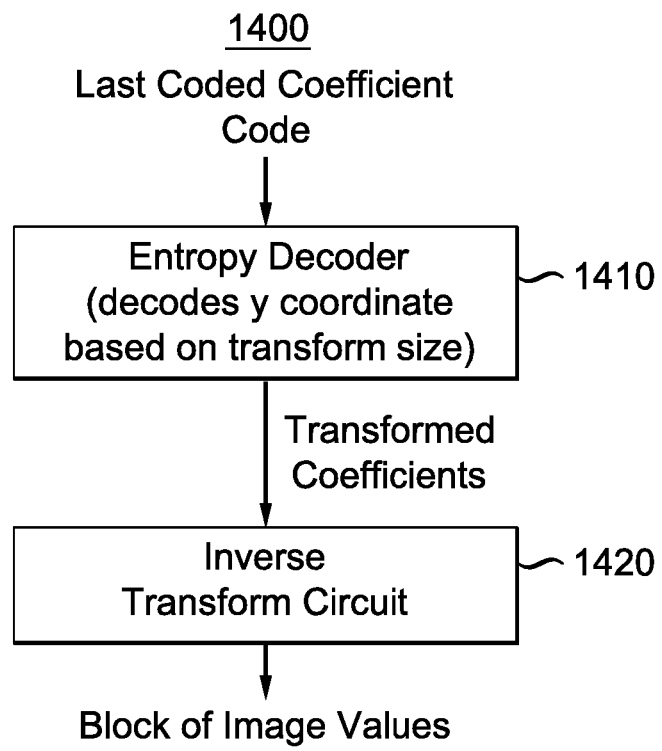
FIG. 14 shows one embodiment of an apparatus for decoding a set of transformed coefficients using the present principles.

An embodiment of an apparatus 1400 for decoding a set of transformed coefficients is shown in FIG. 14. The apparatus comprises Entropy Decoder 1410 that receives transform coefficients including a code for the last coded coefficient and decodes the y coordinate of the last coded coefficient using knowledge of the size of the transform to decode the y coordinate. The output of Entropy Decoder 1410 is in signal connectivity with the input of Inverse Transform Circuit 1420. Inverse Transform Circuit 1420 receives the transformed coefficients on its input port and inverse transforms them to produce a block of image values on its output port.

The aforementioned embodiments can be implemented in Set Top Boxes (STBs), modems, gateways or other devices that perform video encoding or decoding.

The functions of the various elements shown in the figures can be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

What is claimed:

1. A method for encoding a block of transformed coefficients, comprising:
    transforming a block of a first number of image values using a partial transform transforming the block into a block of a second number of transformed coefficients, the second number being less than the first number and being representative of a size of the partial transform, the size of the partial transform being representative of positions of transformed coefficients in the block of transformed coefficients; and entropy encoding two coordinates defining a position in the block of a last non-zero transformed coefficient determined by a scanning of the transformed coefficients, wherein the entropy encoding of one coordinate of the two coordinates depends on the size of the partial transform.

2. The method of claim 1, wherein an information representative of the size of the partial transform is encoded in a bitstream.

3. The method of claim 1, further comprising:

splitting each of the two coordinates up into a prefix and a suffix; and inferring the value of the prefix of a coordinate from the size of the partial transform.

4. The method of claim 1, wherein an adaptive set of partial transforms that are learned offline is used to transform the block of image values.

5. An apparatus configured to encode a set of transformed coefficients, comprising:

a transform circuit configured to operate on a block of a first number of image values using a partial transform transforming the block into a second number of transformed coefficients, the second number being less than the first number and being representative of a size of the partial transform, the size of the partial transform being representative of positions of transformed coefficients in the block of transformed coefficients; and an entropy encoding circuit configured to entropy encode two coordinates representing a position of a last coded coefficient from the transformed coefficients determined by a scanning of the transformed coefficients, wherein the entropy encoding of a coordinate depends on the size of the partial transform.

6. The apparatus of claim 5, wherein an information representative of the size of the partial transform is encoded in a bitstream.

7. The apparatus of claim 5, wherein the entropy encoding circuit is configured to split each of the two coordinates up into a prefix and a suffix and to infer the value of the prefix of a coordinate from the size of the partial transform.

8. A method for decoding a set of transformed coefficients, comprising:

entropy decoding a code to generate a position of a last coded coefficient of a set of transformed coefficients, the set of transformed coefficients being a result of a partial transform transforming an initial block of a first number of image values into a second number of transformed coefficients, the second number being less than the first number and being representative of a size of the partial transform, the size of the partial transform being representative of positions of transformed coefficients in the block of transformed coefficients, wherein the position of the last coded coefficient is provided by two coordinates, the entropy decoding of a coordinate depending on the size of the partial transform; and inverse transforming the set of transformed coefficients using an inverse partial transform to obtain a resulting block of image values representative of the initial block of image values.

9. The method of claim 8, wherein an information representative of the size of the partial transform is decoded from a bitstream.

10. The method of claim 8, further comprising:

splitting each of the two coordinates up into a prefix and a suffix; and inferring the value of the prefix of a coordinate from the size of the partial transform.

11. An apparatus configured to decode a set of transformed coefficients, comprising:

an entropy decoding circuit configured to operate on a code representing a position of a last coded coefficient of a set of transformed coefficients, the set of transformed coefficients being a result of a partial transform transforming an initial block of a first number of image values into a second number of transformed coefficients, the second number being less than the first number and being representative of a size of the partial transform, the size of the partial transform being representative of positions of transformed coefficients in the block of transformed coefficients, wherein the position of the last coded coefficient is provided by two coordinates, the entropy decoding of a coordinate depending on the size of the partial transform; and an inverse transform circuit configured to operate on transformed coefficients using an inverse partial transform to obtain a resulting block of image values representative of the initial block of the first number of image values.

12. The apparatus of claim 11, wherein an information representative of the size of the partial transform is decoded from a bitstream.

13. The apparatus of claim 11, wherein the entropy decoding circuit is configured to split each of the two coordinates up into a prefix and a suffix and to infer the value of the prefix of a coordinate from the size of the partial transform.

14. An apparatus comprising:

a processor; and a non-transitory computer-readable medium storing instructions operative, when executed by the processor, to cause the apparatus to:

entropy decode a code to generate a position of a last coded coefficient of a set of transformed coefficients, the set of transformed coefficients being a result of a partial transform transforming an initial block of a first number of image values into a second number of transformed coefficients, the second number being less than the first number and being representative of a size of the partial transform, the size of the partial transform being representative of position of transformed coefficients in the block of transformed coefficients, wherein the position of the last coded coefficient is provided by two coordinates, the entropy decoding of a coordinate depending on the size of a partial transform; and inverse transform transformed coefficients using an inverse partial transform to obtain a resulting block of image values representative of the initial block of image values.

15. The apparatus of claim 14, wherein an information representative of the size of the partial transform is decoded from a bitstream.

16. The apparatus of claim 14, wherein the instructions are further operative, when executed by the processor, to cause the apparatus to:

split each of the two coordinates up into a prefix and a suffix; and infer the value of the prefix of a coordinate from the size of the partial transform.

17. An apparatus comprising:
a processor; and
a non-transitory computer-readable medium storing instructions operative, when executed by the processor, to cause the apparatus to:
 transform a block of a first number of image values using a partial transform to transform the block into a second number of transformed coefficients, the second number being less than the first number and being representative of a size of the partial transform, the size of the partial transform being representative of position of transformed coefficients in the block of transformed coefficients; and
 entropy encode two coordinates defining a position in the block of a last non-zero transformed coefficient determined by a scanning of the transformed coefficients,
 wherein the entropy encoding of the coordinate of the two coordinates depends on the size of the partial transform.

18. The apparatus of claim 17, wherein an information representative of the size of the partial transform is encoded in a bitstream.

19. The apparatus of claim 17, wherein the instructions are further operative, when executed by the processor, to cause the apparatus to:
 split each of the two coordinates up into a prefix and a suffix; and
 infer the value of the prefix of a coordinate from the size of the partial transform.

20. The apparatus of claim 17, wherein an adaptive set of partial transforms that are learned offline is used to transform the block of image values.

* * * * *